Nov. 22, 1949  M. F. A. JULIEN ET AL  2,488,978
FRAME FOR AUTOMOBILE VEHICLES
Filed Oct. 17, 1946  5 Sheets-Sheet 1
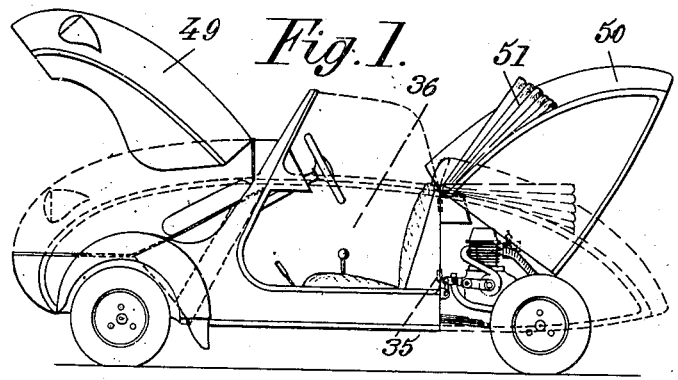
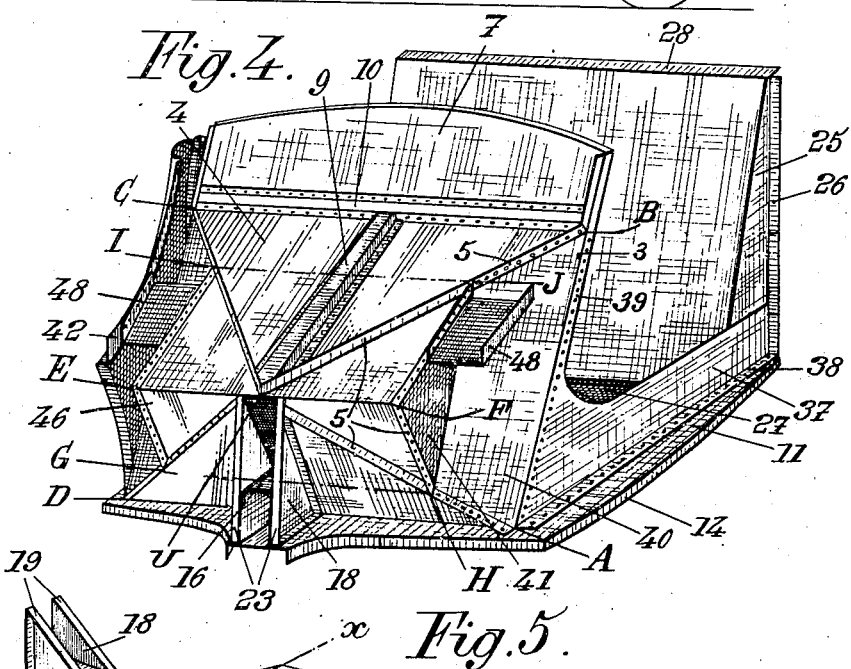
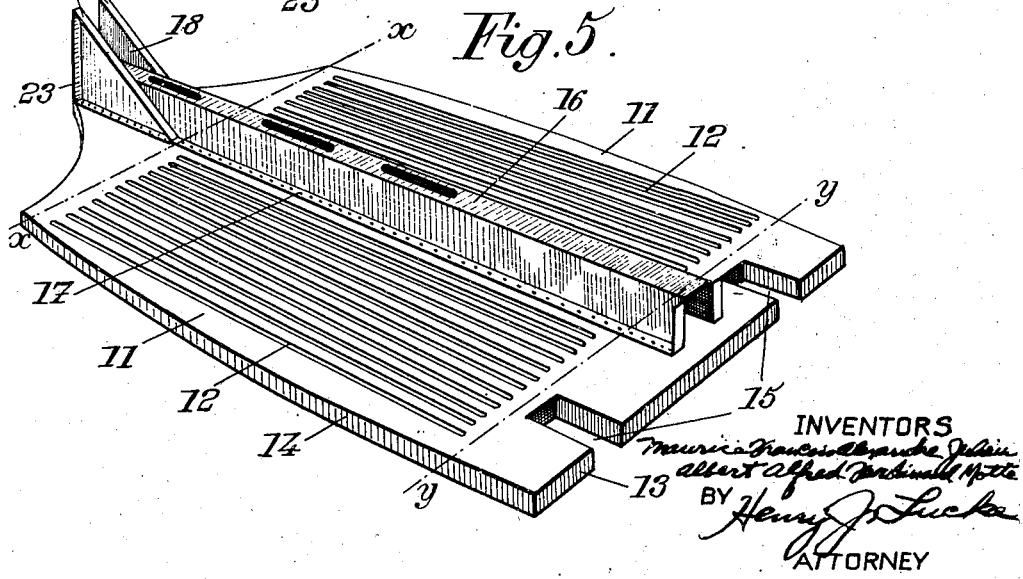
INVENTORS
Maurice François Alexandre Julien
Albert Alfred Ferdinand Motte
BY Henry J. Lucke
ATTORNEY

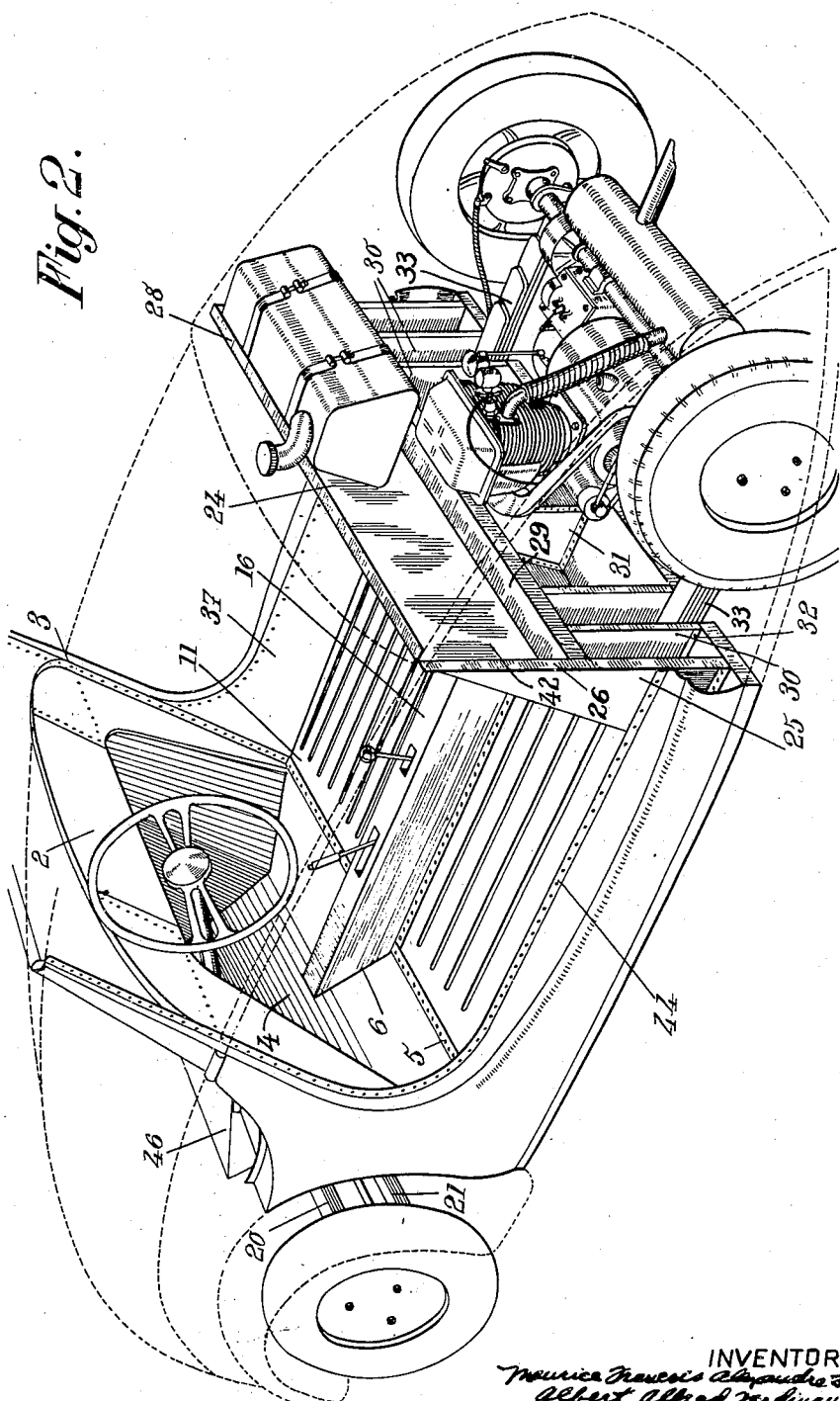

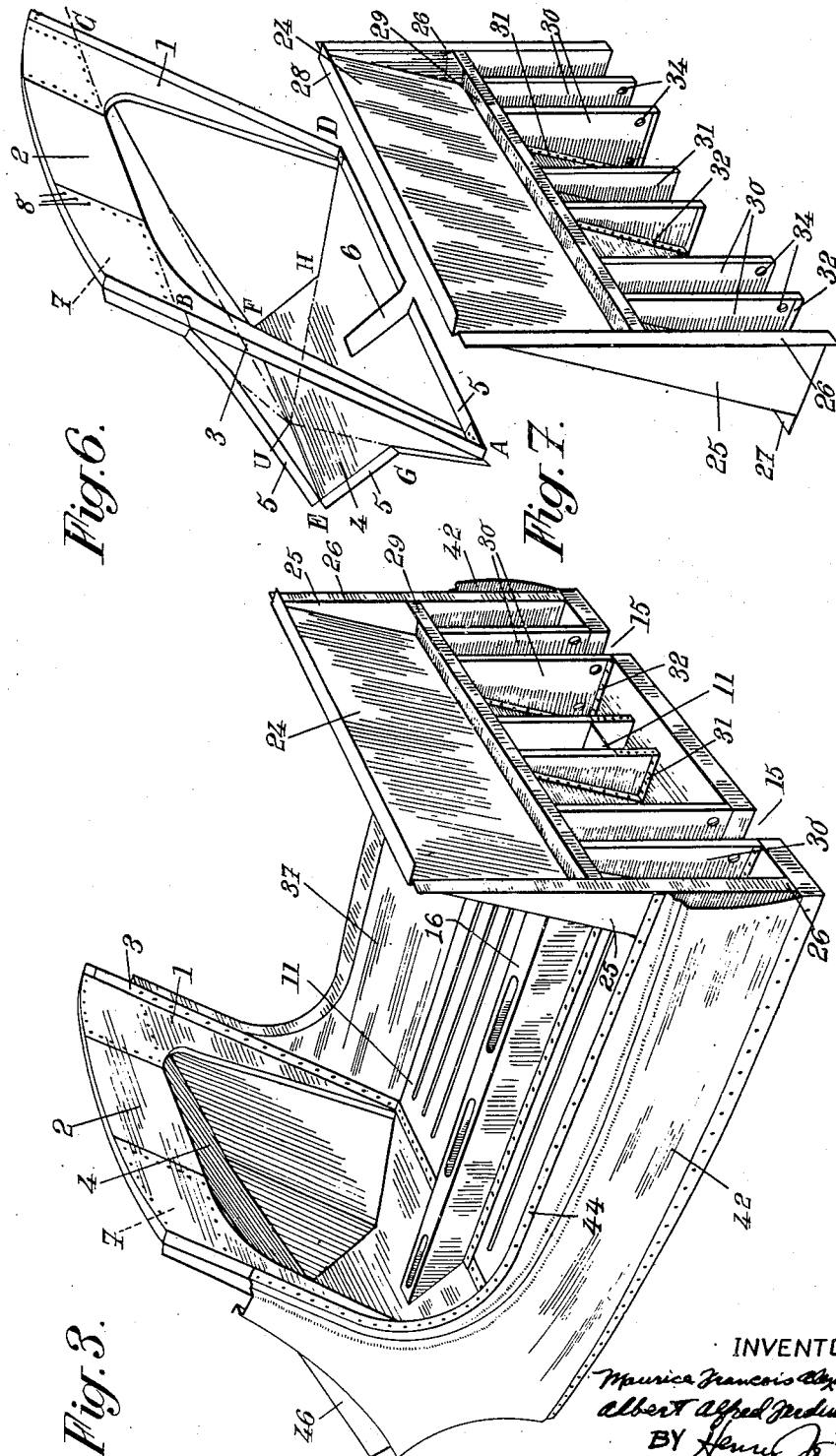

Nov. 22, 1949 M. F. A. JULIEN ET AL 2,488,978
FRAME FOR AUTOMOBILE VEHICLES
Filed Oct. 17, 1946 5 Sheets-Sheet 5

Patented Nov. 22, 1949

2,488,978

UNITED STATES PATENT OFFICE 2,488,978

FRAME FOR AUTOMOBILE VEHICLES

Maurice François Alexandre Julien, Toulouse, and Albert Alfred Fernand Motte, Paris, France Application October 17, 1946, Serial No. 703,914
In France October 18, 1945

5 Claims. (Cl. 296—28)

The present invention relates to frames, in particular for automobile vehicles, and its object is to provide a structure of this kind which is better adapted to meet the requirements of practice than those made up to this time.

A preferred embodiment of our invention will be hereinafter described with reference to the accompanying drawings, given merely by way of example and in which:

Fig. 1 shows in elevation an automobile vehicle of the touring type with two doors, made according to our invention;

Fig. 2 shows, in rear perspective view, the same vehicle, on an enlarged scale, certain elements being removed;

Fig. 3 shows, in rear perspective view, the open shell system which constitutes the frame of said vehicle;

Fig. 4 shows in front perspective view the same shell with certain parts removed;

Figure 10:
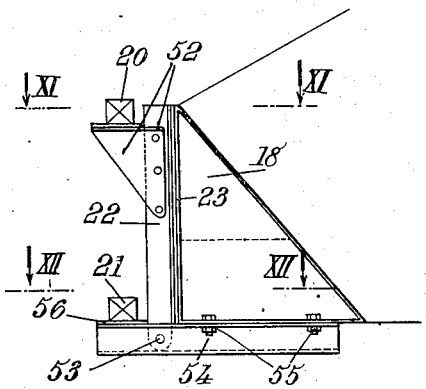
Figure 11:
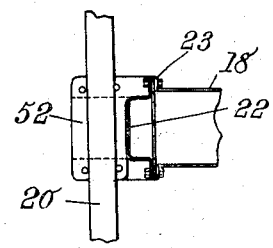
Figure 12:
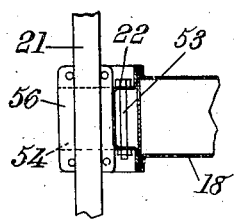

Fig. 5 separately shows, in perspective view, the floor of said shell;

Figs. 6 to 9 show, in perspective view, certain parts of this shell, separately;

Figs. 10 to 12 show, in elevation and in sectional plane view on the lines XI—XI and XII—XII of Fig. 10, respectively, certain parts of said vehicle.

The structure according to our invention is in the form of an open shell, rigidified at least at the front by a polyhedral system, and, for this purpose, according to one of the features of the present invention, we have recourse to at least three units intended to constitute respectively the front polyhedral or at least part thereof, the floor, and a rear unit which may act as seat back support, which three units are assembled by welding with one another and with the side members.

Furthermore, according to another feature of our invention, most of the elements of these units are obtained by cutting and folding (therefore without stamping), such a solution making it possible to utilize steels of a higher quality than those suitable for stamping, for instance 40 kg. per sq. mm. steels or chromium-molybdenum steels, which permits substantial saving on the weight. Also the assembly surfaces between the respective units should be planes, so as to make it possible to make use of automatic spot welding.

Concerning first the front unit, and supposing that the stiffening polyhedral system includes a pyramid having its apex at U and its basis at ABCD (Figs. 4 and 6), advantageously said unit includes only two faces UAD and UCB of the pyramid, the two other faces being constituted by extensions of the side members, as it will appear hereinafter. Such a solution leads to greater simplicity of construction.

Said unit is therefore constituted, on the one hand, by a frame-shaped panel 1, located in plane ABCD, with at the upper part a sheet metal height sufficient at 2 for ensuring rigidity, with stiffening and assembling flanges 3, and, on the other hand, by a gable-shaped metal sheet 4 assembled to said frame at top and bottom, also with stiffening and assembling flanges 5. A notch is provided at 6 for the passage of a central beam to be referred to hereinafter.

Preferably, the apex portion of the pyramid is replaced by a dihedral EF, which dihedral connected at GH, IJ (Fig. 4) to the base portion of the pyramid.

At the upper part, the sheet metal that constitutes this dihedral extends at 7 along the corresponding portion of frame 2 which it contributes to reinforce (this portion therefore including two sheet metal thicknesses welded at 8). Supplementary reinforcements may be provided at 9, 10 (Fig. 4).

Concerning now the floor (Fig. 5), it is constituted, for instance, by metal sheet 11, advantageously ribbed at 12, with flanges at 13 and 14 (the latter being curvilinear, if the profile of the vehicle requires it), and notches 15 at the rear, in particular for the passage of springs.

Preferably, we combine with this floor a central beam 16, welded at 17, which may serve as a passage for various control means (towards the engine, towards the brakes, etc.), and which contributes in reinforcing the whole. At the front, this beam 16 extends through the above mentioned pyramid, at 6, with the adjunction of coupling gussets such as 18, with flanges 19, which gussets may serve to support the front suspension, and thus to transmit to the pyramid the stresses supported by said suspension.

The latter is supposed, on the drawings, to be constituted by two transverse springs 20, 21 (Figs. 2 and 10 to 12), supported by a U section beam 22 fixed on the flanges 23 of gussets 18.

Figs. 10 to 12 show, by way of example, a particularly advantageous mounting which ensures a great rigidity.

Box-shaped beam 22 supports, on the one hand, at the upper part, a bracket 52 on which spring 20 is fixed and, on the other hand, at the lower part, at 53, a longitudinal element 54, also assembled at 55 under beam 16, and to which the second spring 21 is fixed by means of a plate 56.

As for the third unit, intended to form the rear element of the shell, it is made sufficiently rigid to support the rear suspension, and also the engine, which may be either suspended or unsuspended (and in this case participate at least partially in the displacements of the axle).

This third unit is constituted for instance by a metal sheet 24 (Figs. 3 and 7) which may form a seat back, with bracing elements 25 and stiffening and assembling flanges 26, 27, 28, this sheet being combined with at least one transverse framing 29, for instance Z-shaped, and also with various gussets 30, 31 with flanges 32.

Two pairs of these gussets 30, disposed on either side of the notches 15 of the floor, will serve to support the rear suspension and to transmit the stresses supported by said suspension to the structure, through the intermediate of part 29 and bracing elements 25. Said suspension is supposed, on the drawings, to be constituted by longitudinal springs 33, fixed at 34.

It will be noted that flanges 26, in addition to their function as stiffening means, will advantageously serve to the fixation of the hinges 35 of doors 36 (Fig. 1).

With units as above described, we finally combine side members arranged in such manner that they can, at their front part, close the pyramid above described.

To this effect, said side members include, for instance, lateral portions 37 (Fig. 8) provided with assembling flanges 38, these lateral portions ending at their upper part in uprights 39 suitably bent at 40 to constitute the faces of the pyramid UABC and at 41 to close dihedral EF.

But according to another feature of the invention, there should be added to the side members which have just been specified, stiffening means constituted by metal sheets which may constitute the body-work covering.

Figure 8:
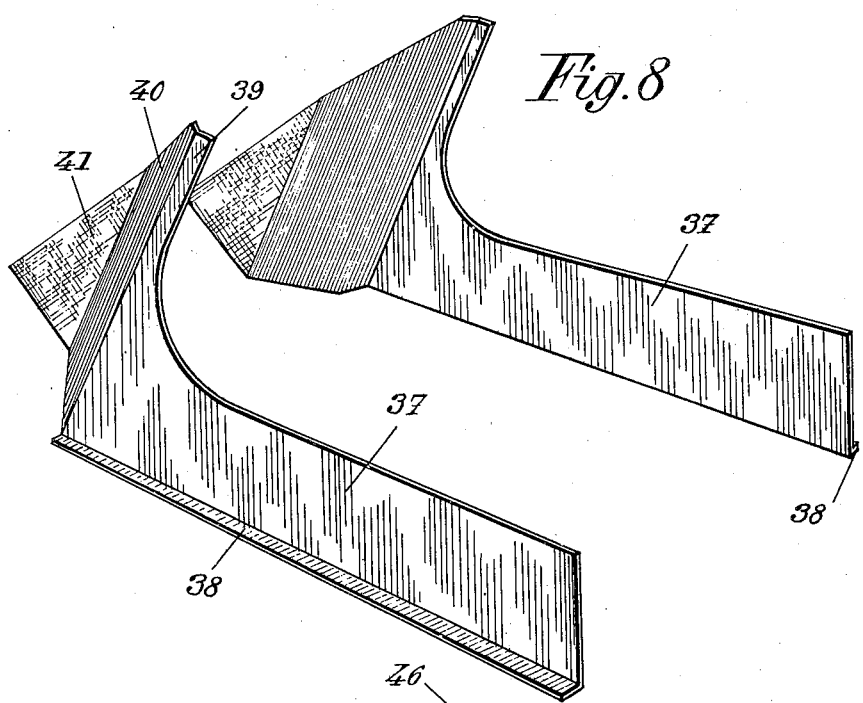
Figure 9:
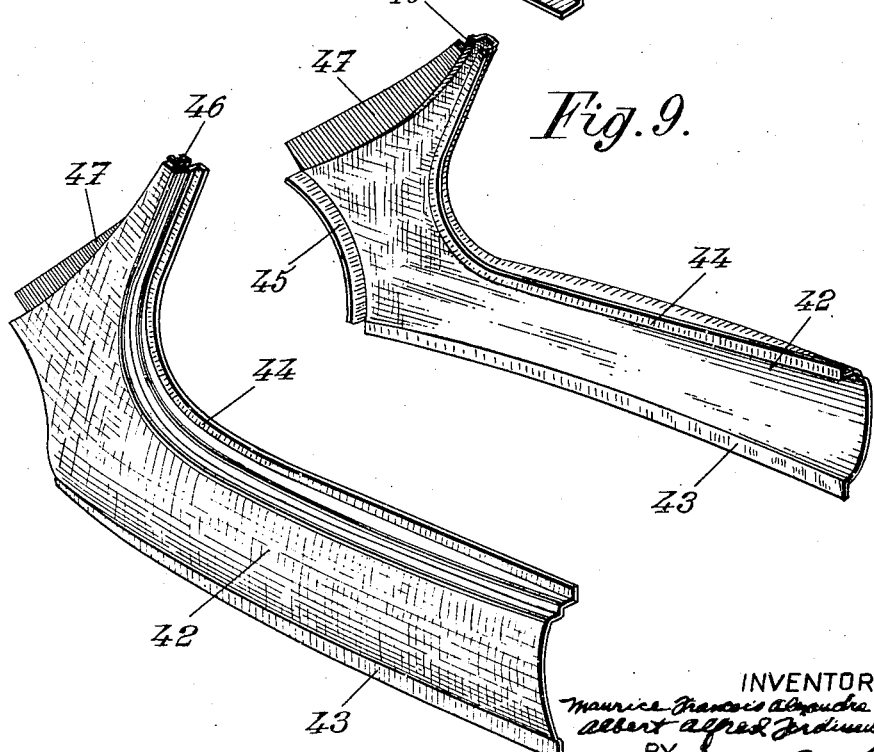

We make use, for instance, of two metal sheets of this kind shown at 42 on Fig. 9 and provided with suitable flanges 43 to 47 to permit the necessary welding assemblies.

It will be noted that flanges 43, 44 and 45 are the only ones, in the various devices which have been described, that have a curved shape; the others are, on the contrary, of plane shape and permit very simple welding assemblies.

Anyway, it is possible, with the units which have been described, to mount the structure with a very simple equipment and in a minimum of time, the assembly taking place for instance as follows:

First, the pyramid, i. e. the unit of Fig. 6, is welded on the floor along line $x$—$x$ through flanges 5, gussets 18 and flanges 19.

Then the rear element, i. e. the unit of Fig. 7, is welded along line $y$—$y$ through bent edges 27 and 32. Side members 37 are then welded on the system thus obtained, at the rear directly on bracing parts 25, then on the floor through flanges 38, and, finally, on the pyramid through flanges 39 which are superposed to flanges 3, then through elements 40 and 41 which are to be welded on the flanges 5 (Figs. 4 and 6) of the pyramid.

Finally, the assembly is completed by the fixation of stamped lateral panels 42 by welding along the various flanges 43 to 47 with the interposition of gussets 48 at the front, between the pyramid and said panels 42 (Fig. 4).

The system thus obtained (Fig. 3) includes the essential elements of the body: As a matter of fact, the doors can easily be mounted in the door frame limited by panels 37 and the flanges 26 of the rear unit, whereas the front part and the rear part of the body may be constituted by opening hoods such as 49 and 50 (Fig. 1); besides it is to be well understood that certain of the parts, in particular the front wings, may be fixed permanently in a suitable manner.

As for the wheel trains and the engine, they may be mounted in a very simple way at the front of the pyramid and in the rear housings 15. The car may be of the drop-head type, as shown at 51, or of the closed car type.

Metal sheet 24 might be notched in order to give access to a rear luggage casing mounted in overhanging manner or to supplementary seats.

Such a structure has, over existing ones, many advantages, in particular: that of permitting a very low cost of manufacture owing to the simplicity of mounting which is due to the fact that most of the elements are obtained by mere cutting and folding and are assembled along planes, that of being of very light weight, in particular when high tensile steel is utilized as above indicated, and that of having of a high structural rigidity.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A vehicle frame which comprises, in combination, a floor, a sheet metal part bent to form a dihedral having a horizontal ridge turned frontwardly, said part being fixed to the upper face of said floor at the front thereof along a line at right angles to the longitudinal middle plane of the vehicle, a transverse back structure fixed to the upper face of said floor at the rear thereof along a line at right angles to the longitudinal middle plane of the vehicle, substantially vertical side plates interconnecting said floor with both said front dihedral metal part and said transverse back structure, the front portions of said side plates being shaped and assembled with said front dihedral part to form therewith a pyramidal assembly having its apex in the middle part of said dihedral ridge and a hollow beam fixed to said frame along the longitudinal middle line thereof, said beam extending through said dihedral part so as to project frontwardly therefrom and to be able to support front wheel suspension means.

2. A vehicle frame which comprises, in combination, a floor, a structure including a rectangular frame transverse to said floor and perpendicular to the longitudinal middle plane of said vehicle and a sheet metal part bent to form a dihedral having a horizontal ridge parallel to the top and bottom edges of said frame and turned frontwardly, said part being fixed to said frame at top and bottom, and the whole structure being secured to the upper face of said floor at the front thereof, a transverse back structure fixed to the upper face of said floor at the rear thereof along a line at right angles to the longitudinal middle plane of the vehicle, substantially vertical side plates interconnecting said floor with both said front dihedral metal part and said transverse back structure, the front portions of said side plates being shaped and assembled with said front dihedral part to form therewith a pyramidal assembly having its apex in the middle part of said dihedral ridge and a hollow beam fixed to said frame along the longitudinal middle line thereof, said beam extending through said dihedral part so as to project frontwardly therefrom and to be able to support front wheel suspension means.

3. A vehicle frame which comprises, in combination, a floor, a polyhedral stiffening structure fixed to said floor at the front thereof having a polygonal base located in a plane transverse to said floor and perpendicular to the longitudinal middle plane of the vehicle, a back structure fixed to said floor at the rear thereof located substantially in a plane transverse to said floor and perpendicular to the longitudinal middle plane of the vehicle, bracing means between said floor and said two structures to prevent warping of said floor, and a plurality of gusset plates located in longitudinal planes, rigid with both said back structure and said floor and distributed between the lateral ends of said back structure.

4. A vehicle frame which comprises, in combination, a floor, a structure including a rectangular frame transverse to said floor and perpendicular to the longitudinal middle plane of said vehicle and a sheet metal part bent to form a dihedral having a horizontal ridge parallel to the top and bottom edges of said frame and turned frontwardly, said part being fixed to said frame at top and bottom, and the whole structure being secured to the upper face of said floor at the front thereof, a transverse back structure fixed to the upper face of said floor at the rear thereof along a line at right angles to the longitudinal middle plane of the vehicle, a plurality of gusset plates located in longitudinal planes, rigid with both said back structure and said floor and distributed between the lateral ends of said back structure, and substantially vertical side plates interconnecting said floor with both said front dihedral metal part and said transverse back structure, the front portions of said side plates being shaped and assembled with said front dihedral part to form therewith a pyramidal assembly having its apex in the middle part of said dihedral ridge.

5. A vehicle frame which comprises, in combination, a floor, a structure including a rectangular frame transverse to said floor and perpendicular to the longitudinal middle plane of said vehicle and a sheet metal part bent to form a dihedral having a horizontal ridge parallel to the top and bottom edges of said frame and turned frontwardly, said part being fixed to said frame at top and bottom, and the whole structure being secured to the upper face of said floor at the front thereof, a transverse back structure fixed to the upper face of said floor at the rear thereof along a line at right angles to the longitudinal middle plane of the vehicle, a plurality of gusset plates located in longitudinal planes, rigid with both said back structure and said floor and distributed between the lateral ends of said back structure, some of said gusset plates being adapted to support rear wheel suspension means, and substantially vertical side plates interconnecting said floor with both said front dihedral metal part and said transverse back structure, the front portions of said side plates being shaped and assembled with said front dihedral part to form therewith a pyramidal assembly having its apex in the middle part of said dihedral ridge.

MAURICE FRANÇOIS ALEXANDRE JULIEN.
ALBERT ALFRED FERNAND MOTTE.

REFERENCES CITED

The following references are of record in the file of this patent:

UNITED STATES PATENTS

| Number | Name | Date |
|---|---|---|
| 1,876,905 | Freeman et al. | Sept. 13, 1932 |
| 2,007,134 | Rosenberg | July 2, 1935 |
| 2,077,751 | Floss | Apr. 20, 1937 |
| 2,148,950 | Maier | Feb. 28, 1939 |
| 2,157,075 | Grade | May 2, 1939 |
| 2,190,227 | Best | Feb. 13, 1940 |
| 2,190,551 | Swallow | Feb. 13, 1940 |
| 2,233,316 | Klavik | Feb. 25, 1941 |

FOREIGN PATENTS

| Number | Country | Date |
|---|---|---|
| 626,345 | Germany | Feb. 24, 1936 |